4 Sheets--Sheet 2.

J. HAPPE.
Sewing-Machines for Quilting.

No. 153,767. Patented Aug. 4, 1874.

Witnesses:

Inventor:

J. HAPPE.
Sewing-Machines for Quilting.
No. 153,767.  Patented Aug. 4, 1874.
4 Sheets--Sheet 3.
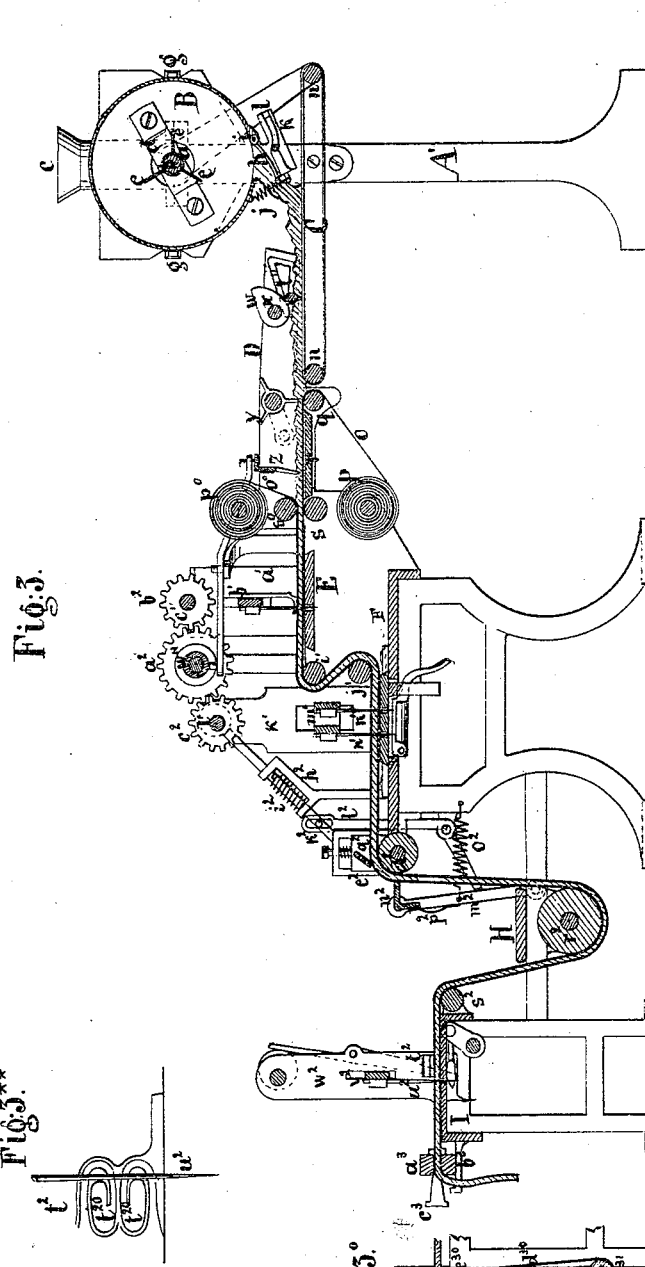
Fig. 3.
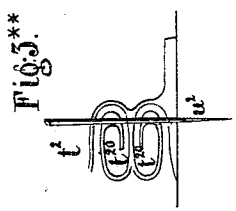
Fig. 3.**
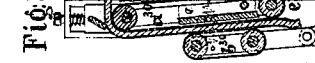
Fig. 3.°
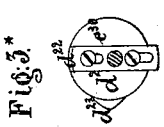
Fig. 3.*
Witnesses:
Ernst Bilhuber
Henry Gentner
Inventor
John Happe
per
Van Santvoord & Stauff
Attys
THE GRAPHIC CO. PHOTO-LITH. 39 & 41 PARK PLACE, N.Y.

J. HAPPE.
Sewing-Machines for Quilting.
No. 153,767. Patented Aug. 4, 1874.
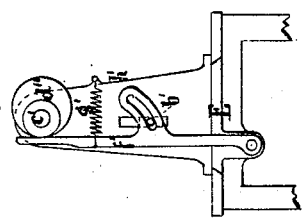
Fig.8.
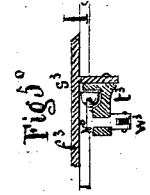
Fig.5°
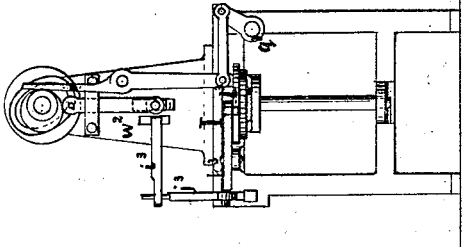
Fig.6.
Fig.7.
Fig.5**
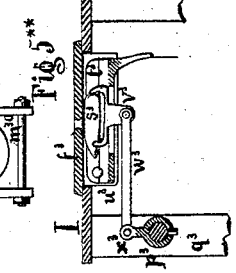
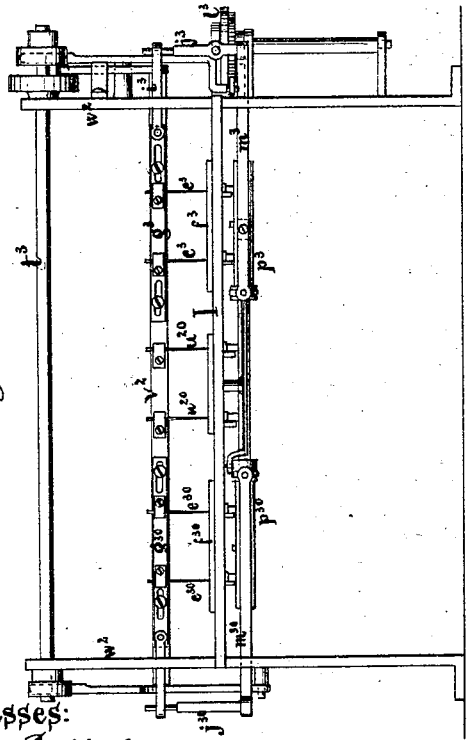
Fig.4.
Fig.5.
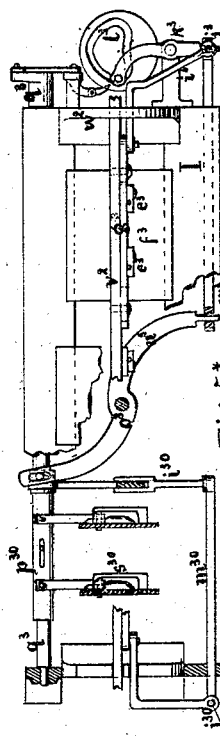
Fig.5*
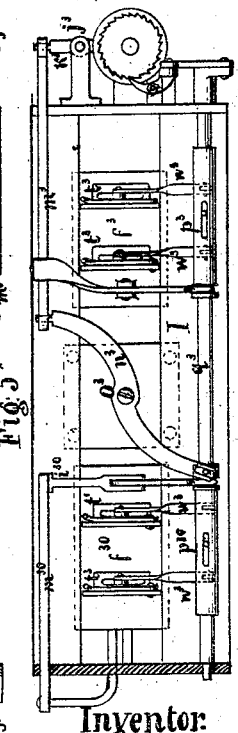
Witnesses:
Ernst Bilhuber
Henry Gentner
Inventor:
John Happe
Van Santvoord & Hauff
attys

UNITED STATES PATENT OFFICE.

JOHN HAPPE, OF NEW YORK, N. Y.

IMPROVEMENT IN SEWING-MACHINES FOR QUILTING.

Specification forming part of Letters Patent No. 153,767, dated August 4, 1874; application filed March 14, 1874.

*To all whom it may concern:*

Be it known that I, JOHN HAPPE, of the city, county, and State of New York, have invented a new and useful Improvement in Sewing-Machine for Quilting; and I do hereby declare the following to be a full, clear, and exact description thereof, which will enable those skilled in the art to make and use the same, reference being had to the accompanying drawing forming part of this specification, in which drawing—

Figure 1:
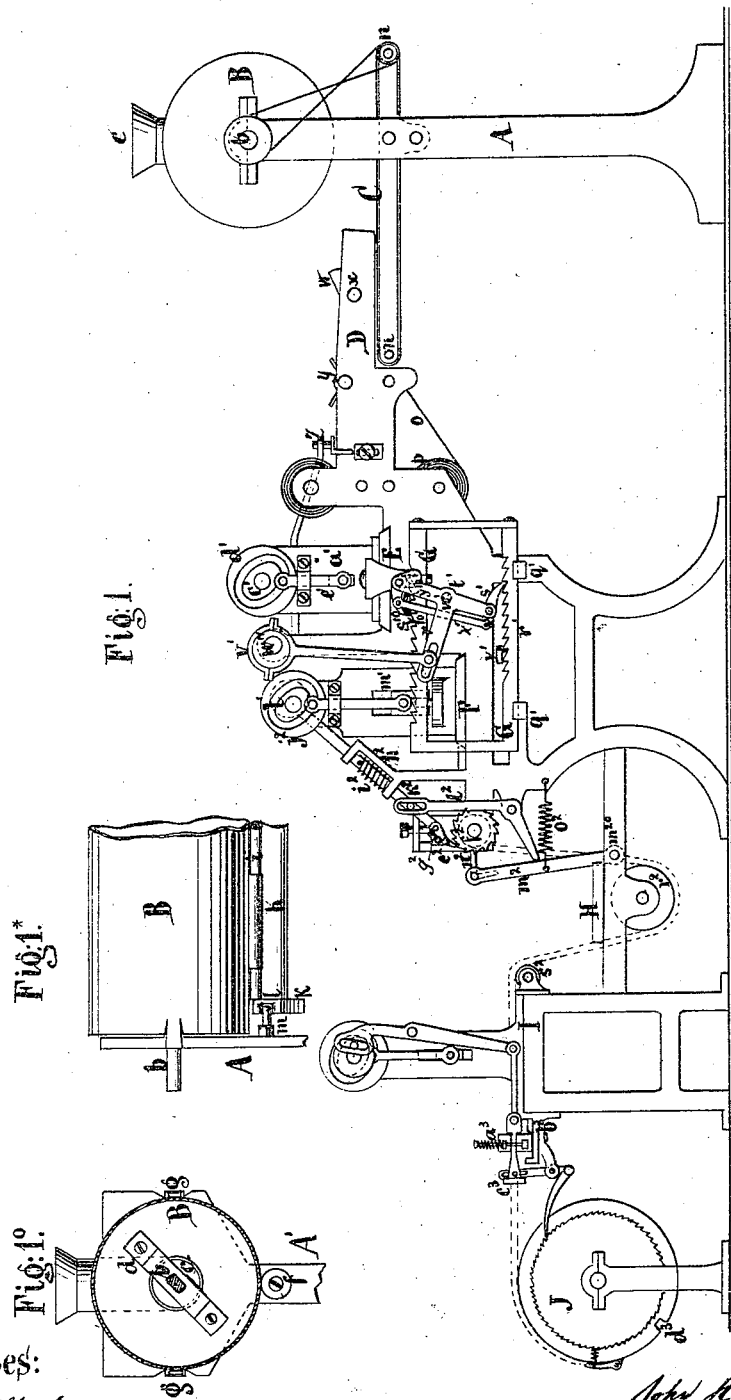
Figure 2:
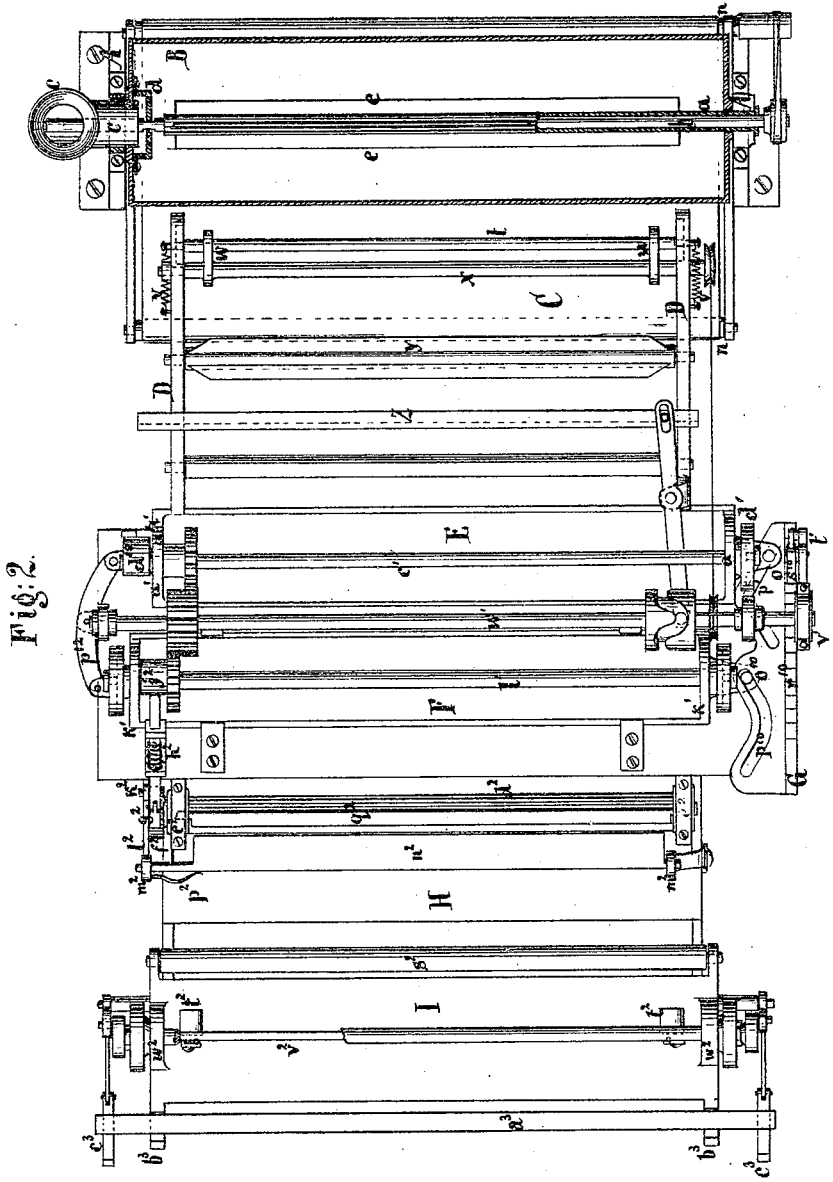

Figure 1 represents a side view of this invention. Fig. 2 is a plan or top view of the same. Fig. 3 is a longitudinal vertical section of the same. Fig. 4 is a front view of a modification thereof. Fig. 5 is a sectional plan or top view thereof.

The remaining figures are details which will be referred to as the description proceeds.

Similar letters indicate corresponding parts.

This invention relates to the peculiar arrangement of a mechanism for feeding the filling material between the two sheets of muslin or other material used for quilting; also, to a novel mechanism for drawing the fabric through under the needles; also, to a drum which serves to take up and to measure the fabric after the same has been sewed.

In the drawing, the letters A A′ designate two standards, which rise from the floor or from the bed of the machine. In the standard A is secured a tube, $a$, (see Figs. 2 and 3,) through which extends a solid shaft, $b$, to which a revolving motion is imparted by gear-wheels or otherwise. On the standard A′ is secured a feed-pipe, $c$, which is bent inward and forms the bearing for a drum, B, that contains the filling material. The opposite end of this drum turns freely on the tube $a$, and this tube extends close to a bridge, $d$, which is secured to the head of the drum over the feed-opening, and which is provided with an oblong slot that straddles a flattened portion of the shaft $b$, so that by turning this shaft a revolving motion is imparted to the drum. From the tube $a$ extend blades $e$, which may be made radial, or which are, by preference, made spiral, so that by their action the filling material which is introduced through the feed-pipe $c$ will be uniformly distributed throughout the drum B. That end of the drum which is nearest to the feed-pipe is supported by a friction-roller, $f$, which serves to keep the same steady; and, if desired, lips $g$ may be formed on the standard A′, which overlap the edge of the drum, and effectually prevent said drum from being thrown out of position. (See Fig. 1°.) The drum B is provided with a gate, $h$, which swings on a pivot, $i$, and is subjected to the action of a spring, $j$, that has a tendency to close the same. To one end of said gate is secured a toe, $k$, provided with a cam-groove, $l$, and as the drum revolves this cam-groove engages with a pin, $m$, that projects from the standard A, Fig. 1*. By this arrangement, the gate is opened for a short time, and a quantity of the filling material contained in the drum is permitted to discharge. As soon as the cam-groove $l$ has passed the pin $m$, the gate closes. The filling material, which discharges from the drum B, drops upon an endless apron, C. This apron is stretched over two rollers, $n$, and it receives a slow motion by means of a belt or otherwise, so that the filling material dumped on it will be carried in between the two sheets, $o\ o^0$, which are used for the quilting. The sheet $o$ is taken from a roll, $p$, and it passes round a roller, $q$, and over the table $r$ and roller $s$ to the sewing-machine, while the sheet $o^0$ is taken from a roll, $p^0$, and passes under the roller $s^0$, as shown in Fig. 3.

While the filling material rests upon the apron C, it is exposed to the action of an evener, $t$, which consists of a rod extending across the apron, and supported in cam-grooves $u$, Fig. 3, which are formed in the inner surfaces of arms D, which extend from the main frame of the sewing mechanism. Springs $v$ serve to pull the evener forward toward the sewing mechanism, and cams $w$, which are mounted on revolving shafts $x$, serve to press said evener back against the action of the springs $v$. As the evener is forced back, it serves to spread the filling material on the apron in a flat even layer, and whenever the cams $w$ release the evener, it follows the action of its springs, which carry the same to the forward end of the cam-grooves $u$, ready for a succeeding stroke. The cam-grooves are so formed that during its forward motion the evener is raised out of contact with the filling material on the apron. Said evener may be made with or without teeth.

As the filling material passes from the apron C upon the lower sheet $o$, it is exposed to a revolving beater, $y$, which assists in drawing the same from the apron upon the sheet, and which also assists in reducing the layer of the filling material to a uniform thickness. Said layer is finally exposed to the action of a rake, $z$, to which a transverse reciprocating motion is imparted by a cam and lever, or any other suitable mechanism.

By the action of this rake the layer of filling material is uniformly distributed over the surface of the lower sheet $o$, and it passes with this sheet in between the rollers $s\ s^0$, so that the two sheets $o\ o^0$, with the filling material between them, are carried into the sewing mechanism. This mechanism consists essentially of two tables, E F, which extend transversely across the main frame of the machine and are fitted in suitable guide-grooves, so that a reciprocating motion can be imparted to them. The table E is situated at a higher level than the table F, so that easy access can be had to the needles and other parts connected to either of said tables.

From the ends of the table E rise two standards, $a^1$, which are provided with vertical slots to receive the needle-bar $b^1$, Fig. 3; and the upper parts of said standards form the bearings for a shaft, $c^1$, on the ends of which are mounted cams $d^1\ d^{10}$, that serve to impart to the needle-bar the required rising and falling motions. The cam $d^1$ is simply a disk with a cam-groove (see Fig. 1) that engages with a pin projecting from a rod, $e^1$, which is firmly secured to the needle-bar. I prefer to use a cam, $d^{10}$, such as shown in Fig. 8. This cam acts on a lever, $f^1$, which is pressed up against its surface by a spring, $g^1$, and which swings on a pivot secured in a bracket firmly attached to the table E. From this lever extends an arm, $h^1$, with a cam-slot which straddles a pin projecting from the end of the needle-bar. As the cam $d^1$ revolves it imparts to the lever $f^1$ an oscillating motion; and by the action of the slotted arm $h^1$ a rising and falling motion is imparted to the needle-bar. On the needle-bar $b^1$ is secured a series of needles, at suitable distances apart, and with each needle is combined a shuttle working in a race beneath the table.

The fabric to be sewed passes from the table E over a roller, $i^1$, and under a roller, $j^1$, to the level of the table F; and in its passage through the machine said fabric is kept taut and depressed upon the tables E F, as will be presently more fully explained.

The rollers $i^1$ and $j^1$ have their bearings in brackets which are firmly connected to the main frame, so that the fabric to be sewed is prevented from partaking of the reciprocating motion of the table E and needle-bar $b^1$. From the ends of the table F rise standards $k^1$, which form the bearings for a shaft, $l^1$, and which are provided with oblong guide-slots for the needle-bar $m^1$. This needle-bar is made double, so that two rows of needles, $n^1\ n^{10}$, can be attached to it, each of the needles $n^{10}$ being situated behind one of the needles $n^1$, Fig. 3; and, since the needle carriage or table F receives a reciprocating motion, two rows of parallel stitches are produced at the same time, and these stitches form squares, as will be presently more fully explained. To each of the needle-carriages E and F is secured a pin, $o^1$ and $o^{10}$, respectively. These pins engage with cam-slots $p^1\ p^{10}$, Fig. 2, which are formed in a flange projecting from the side of a frame or cage, G, Figs. 1 and 2, that slides in guides $q^1$ secured to the main frame of the machine. Said cage is provided with two sets of ratchet-teeth, which point in opposite directions, Fig. 1, and with these ratchet-teeth engage the pawls $s^1\ s^{10}$, respectively, which are pivoted to a bell-crank lever, $t^1$, that turns on a pivot, $w^1$, fastened in the main frame, and to which an oscillating motion is imparted by means of an eccentric, $v^1$, which is mounted on the driving-shaft $w^{11}$. Said pawls are connected by a rod, $x^1$, so that, if one of the pawls is thrown in gear with its ratchet-teeth, the other is thrown out of gear, and vice versa. On each of the rack-bars $r^1\ r^{10}$ is secured a projection, $y^1\ y^{10}$; and if one of the pawls $s^{10}$, by the motion of the bell-crank lever $t^1$, is caused to ride upon the corresponding projection, Fig. 1, this pawl is thrown out of gear with its rack-bar, and the other pawl, $s^1$, is thrown in gear, and the motion of the cage G is reversed automatically. At the same time, by the action of the cam-slots $p^1\ p^{10}$ on the pins $o^1\ o^{10}$, the needle-carriages are caused to move, step by step, first in one direction and then in the other, and the stitches produced by the various needles run in a zigzag direction.

By using two cams, $p^1\ p^{10}$, of different forms, different movements can be given to the two needle-carriages, and stitches or figures of any desired form or shape can be produced, so that the quilt can be finished like a hand-made quilt, or that the surface of the material can be ornamented to suit the taste.

For producing simple diamonds, or squares, or uniform figures, the two needle-carriages are connected by a lever, $p^{12}$, Fig. 2, which receives an oscillating motion by a cam, and which imparts to each of the needle-carriages the same movement, but in opposite directions.

The main shaft $w^{11}$ is mounted in standards rising from the main frame, and it is geared with the shafts $c^1$ and $l^1$ of the needle-carriages E and F by a cog-wheel, $a^2$, which meshes in cog-wheels $b^2\ c^2$ on the shafts $c^1\ l^1$; and, since these two shafts reciprocate with their carriages, the face of the cog-wheel $a^2$ must be wide enough to remain in gear while the cog-wheels $b^2\ c^2$ change their position. In front of the table or carriage F is the tension or feed mechanism, which serves to draw the material to be sewed through under the needles. This mechanism consists of a roller, $d^2$, which has its bearings in boxes $e^2$ that are firmly secured to the main frame of the machine. On the axle of this roller is mounted a ratchet-wheel, $f^2$, which is exposed to the action of a pawl, $g^2$, that slides in a bracket, $h^2$, secured to the main frame, and receives a reciprocating motion by the combined action of a spring, $i^2$, and cam $j^2$. This cam is mounted on the shaft $l^1$ of the needle-carriage F, and its face is of such a width that its action on the pawl is not affected by the reciprocating motion of the needle-carriage.

The roller $d^2$ is adjustable on its axis, so that it can be set concentric or eccentric with said axis. By adjusting said roller on its axis in an eccentric position, its action on the quilt becomes variable, so that in sewing curved seams the feed-motion adapts itself to the varying direction of the stitches, and stitches of uniform length are produced. For this purpose, a slide, $d^{22}$, (see Fig. 3*,) is fitted in the end of the roller $d^2$, and in this slide the axle is fastened. The slide is adjusted by set-screws, and a scale marked on it shows its position. The roller $d^2$ may be mounted concentric on its axle, and provided with one or more ribs, $d^{23}$, to provide for certain irregularities in the feed-motion. From the shank of said pawl projects a pin, $k^2$, which engages with a bell-crank lever, $l^2$, the lower arm of which bears upon a frame, $m^2$. This frame swings on pivots $m^{20}$ and carries an L-shaped blade, $n^2$, one edge of which is pressed up against the surface of the roller $d^2$ by means of springs $o^2$, which act on the frame $m^2$, (see Figs. 2 and 3,) said blade being hung on pivots and subjected to the action of springs $p^2$, (see Fig. 3,) which press its edges up against the roller. Over this roller is placed a stop-pawl, $q^2$, which swings on pivots in the journal-boxes $e$ and prevents the retrograde movement of the fabric passing over said roller. When the pawl $g^2$ that moves the roller $d^2$ is pushed forward, the bell-crank lever $l^2$ is moved so as to release the swinging frame $m^2$, and the edge of the L-shaped blade $n^2$ is drawn up firmly against the roller, so that the fabric passing over said roller is compelled to move with it. When the pawl $g^2$ is retracted by the action of the spring $i^2$, the bell-crank lever $l^2$ bears on the frame $m^2$, and the L-shaped blade $n^2$, which turns down by its contact with the roller, is permitted to recover its original position by the action of its spring $p^2$, and during the time when the fabric on the roller is released from the pressure of the L-shaped blade $n^2$, it is prevented from receding by the stop-pawl $q^2$. In front of the tension mechanism is a foot-board, H, in such a position that the workman, by stepping on said foot-board, can conveniently reach the needles in the carriages F and E. After having passed the tension mechanism, the fabric is carried down under a roller, $r^2$, situated beneath the foot-board H, and thence it passes up over a roller, $s^2$, to a table, I, which contains the hemming-guides $t^2$ and needles $u^2$. A detached view of one of these hemming-guides is shown in Fig. 3**. It is composed of two conchoids, which are placed one above the other, one being open above and the other below, so that the edges of the two sheets $o\ o^0$, (composing the quilt,) on being drawn through said conchoids, are tucked under in opposite directions, and as these tucked edges leave the hemming-guides they are exposed to the action of the needles $u^2$, whereby they become immediately secured in the desired position, and the quilt, on leaving the machine, is finished with the exception of its ends.

In order to perform the work successfully, the hemmers $t^2$ must be formed with a stop, $l^{20}$, so that the surplus material, on filling the conchoidal space of the hemmer, is prevented from being crowded in the path of the needle, and the needle, in passing down, will have to penetrate not more than two thicknesses of each sheet. This arrangement is of particular value for quilting purposes, where the edges of the sheets $oo^0$ are always more or less uneven, and without the stops a large number of thicknesses of each sheet would have to be penetrated by the needles whenever the width of such sheets increases to some extent beyond the minimum width. Said hemmers are adjustable on the table for work of different widths. The needles $u^2$ are secured in a needle-bar, $v^2$, which is guided in standards $w^2$ rising from the table I, and receives a rising and falling motion by the action of a cam, in the same manner as the needle-bars of the carriages E and F. (See Fig. 6.)

The quilt, after having been hemmed, passes between two clamping-jaws, $a^3$, which are compressed upon it by suitable springs, and which slide on brackets $b^3$, (Figs. 1, 2, and 3,) secured to the main frame. Between the ends of said jaws are placed wedges $c^3$, which receive a reciprocating motion by a suitable lever-connection and a cam, (Fig. 1,) and which are provided with shoulders, so that if the clamp $a^3$ and the wedges $c^3$ occupy the position shown in Fig. 1, the clamp is closed firmly upon the quilt, and if the wedges are moved outward they carry the clamp and the quilt along. If the wedges move back, the clamp is opened, so as to release the quilt, and it is then carried back, ready for a new hold.

Instead of the clamping-jaws $a^3$, I can employ two endless aprons, $a^{30}$ and $b^{30}$, (see Fig. 3⁰,) which run close together, the apron $a^{30}$ being pressed outward against the apron $b^{30}$ by a swinging bar, $c^{30}$, subjected to the action of a spring, $d^{30}$. By the frictional action of the aprons the work is drawn through the sewing-machine. On leaving the clamping-jaws $a^3$, (or the aprons $a^{30}\ b^{30}$,) the end of the work is fastened to a measuring-drum, J, which is provided with a suitable clamp or catch for retaining said end, and which is propelled step by step by the action of a pawl and ratchet-wheel, Fig. 1, or by any other suitable mechanism. This drum assists in drawing the work through the machine, and it is provided with one or more notches, $d^3$, so that the fabric produced by the sewing-machine can be cut up in quilts of the required length.

Instead of imparting to the needle-carriages E and F a reciprocating motion, as previously described, said carriages may remain stationary, and a reciprocating motion in a horizontal direction may be imparted to the needles $e^3$, in addition to their rising and falling motion, and at the same time the throat-plates $f^3$ will also receive a reciprocating motion to correspond to that of the needles. This arrangement I have shown in Figs. 4 and 5 of the drawing. To accomplish this object I secure the needles $e^3$ in slides $g^3$ $g^{30}$, which are fastened to the needle-bar $v^2$, so that said slides can assume a reciprocating motion in the direction of the length of the needle-bar, while the needle-bar receives a rising and falling motion in the guide-slots of standards rising from the table, as previously described.

The slide $g^3$ connects, by a rod, $i^3$, with an upright bar, $j^3$, which is exposed to the action of a lever, $k^3$, that receives a vibrating motion by means of a cam, $l^3$, Fig. 5. Instead of this cam and lever other means may be employed for the purpose of imparting to the needle-slides and to the throat-plates the required reciprocating motion, such as an eccentric, $l^{30}$, and cage $m^{30}$. (Shown in Fig. 7.)

The upright bar $j^3$ connects, by a rod, $m^3$, with a lever, $n^3$, that has its fulcrum on a pivot, $o^3$, secured to the table I; and by said lever a reciprocating motion is imparted to a sleeve, $p^{30}$, that slides on a rock-shaft, $q^3$, and serves to transmit the required motion to the throat-plate $f^{30}$ and the shuttles $s^{30}$. The rock-shaft $q^3$ receives its motion from the shaft $t^3$, that has its bearings in the standards rising from the table I; and the sleeve $p^{30}$ is feathered on said shaft in such a manner that it is compelled to rotate with the same, while it is free to slide in the direction of its length.

By the rotating motion of the sleeve the required motion of the shuttles is produced, while the sliding motion of said sleeve causes the shuttles and the throat-plate to move with the needles $e^{30}$, and to retain the proper relation toward the same.

The sleeve $p^{30}$ serves to impart motion to the throat-plate and shuttles on one end of the table I; and it connects, by rods $i^{30}$ $m^{30}$, with an upright bar, $j^{30}$, that connects with the needle-slide $g^{30}$ on one end of the needle-bar $v^2$. Near the opposite end of the rock-shaft $q^3$ is a sleeve, $p^3$, Figs. 4 and 5*, which connects directly with the rod $m^3$, and serves to impart the requisite motion to the throat-plate $f^3$ and shuttles $s^3$.

The motion of the needle-slides $g^3$ $g^{30}$ is regulated by the shape of the cam $l^3$, and the slides $g^3$ $g^{30}$ can be made to move in opposite directions, as shown in the example represented by the drawings, and they may be made to move in the same direction.

The cam $l^3$ receives a step-by-step motion from the rock-shaft $q^3$, either by a ratchet-wheel and pawl or by any other suitable mechanism.

On the needle-bar $v^2$ are also secured needles $u^{20}$, which rise and fall with said needle-bar, but have no transverse motion. If desired, however, all the needles may be secured to slides $g^3$ $g^{30}$, and, by arranging two needle-bars, $v^2$, with slides $g^3$ $g^{30}$, one behind the other, the same effect is produced which is produced by the combined action of the needles in the carriages E and F, as above described.

The shuttles $s^3$ $s^{30}$ are inclosed in boxes $t^3$, (best seen in Fig. 5**,) which are pivoted to flanges $u^3$ projecting from the under surfaces of the throat-plates $f^3$ $f^{30}$, so that they can be turned up to their working position, or down, when it is desired to remove the shuttles.

Each of the shuttle-boxes is provided with a finger-piece for the purpose of operating the same; and in its bottom is a slot, through which projects the shuttle-driver $v^3$, which connects, by a rod, $w^3$, with a pin secured in lugs $x^3$, which project from the sleeve $p^3$ or $p^{30}$.

As these sleeves oscillate by the action of the rock-shaft $q^3$ a reciprocating motion is imparted to all the shuttles; and since said sleeves and the throat-plates traverse with the needle-slides, the shuttles and the shuttle-driving mechanism always preserve their proper relation toward the needles.

When the shuttle-boxes $t^3$ are turned down on their pivots the shuttles can be readily removed and reinserted without raising the work from the table.

What I claim as new, and desire to secure by Letters Patent, is—

1. The combination, with an organized sewing mechanism, of an endless apron, C, an evener, $t$, beater $y$, and rake $z$, substantially as and for the purpose herein shown and described.

2. The stationary feed-blades $e$ in the revolving drum B, substantially as set forth.

3. The spring-gate $h$, provided with a toe, $k$, cam-groove, $l$, and stationary pin $m$, in combination with the revolving drum B, substantially as shown and described.

4. The combination of the drum B, having an automatic gate, $h$, with an endless apron, C, and with an organized sewing mechanism, substantially as set forth.

5. The combination of rollers $i^1$ $j^1$ with needle-carriages E F, situated at different levels, substantially as shown and described.

6. The cage G, having rack-bars $r^1$ $r^{10}$ and cam-slots $p^1$ $p^{10}$, in combination with the needle-carriages E and F, substantially as and for the purpose set forth.

7. The feed mechanism, consisting of a roller, $d^2$, and L-shaped blade $n^2$, hinged to a swinging frame, $m^2$, which is acted on by a bell-crank lever, $l^2$, operated by the bar $k^2$, which actuates the propelling-pawl $g^2$ of the roller $d^2$, substantially in the manner set forth.

8. The combination of a stop-pawl, $q^2$, with the feed-roller $d^2$ and L-shaped blade $n^2$, substantially as shown and described.

9. The clamps $a^3$ and wedges $c^3$, said clamps sliding on brackets $b^3$, in combination with a table, T, substantially as described.

10. The combination of a slide, $d^{22}$, with the feed-roller $d^2$, said feed-roller being applied, in connection with an organized sewing mechanism, to operate substantially in the manner herein described.

This specification signed by me this 12th day of March, 1874.

JOHN HAPPE.

Witnesses:
W. HAUFF,
E. F. KASTENHUBER.